United States Patent [19]
Akazawa et al.

[11] Patent Number: 5,168,505
[45] Date of Patent: Dec. 1, 1992

[54] AUTOMATIC GAIN CONTROL DEVICE FOR SPREAD SPECTRUM COMMUNICATION DEVICE

[75] Inventors: Shigeo Akazawa; Takeshi Hashimoto, both of Tokyo, Japan

[73] Assignee: Clarion Co., Ltd., Tokyo, Japan

[21] Appl. No.: 761,218

[22] Filed: Sep. 17, 1991

[30] Foreign Application Priority Data
 Sep. 21, 1990 [JP] Japan .................. 2-253776

[51] Int. Cl.⁵ .................. H04K 1/04; H04L 9/00
[52] U.S. Cl. .................. 375/1
[58] Field of Search .................. 375/1

[56] References Cited
U.S. PATENT DOCUMENTS
4,899,364 2/1990 Akazawa et al. .................. 375/1
4,943,977 7/1990 Uchida et al. .................. 375/1

Primary Examiner—Salvatore Cangialosi
Attorney, Agent, or Firm—Flynn, Thiel, Boutell & Tanis

[57] ABSTRACT

In a spread spectrum communication device it is intended to simplify a circuit and to realize cost down by controlling the gain of correlation spikes on the basis of a peak value held by a peak value holding circuit in a correlation pulse generating circuit.

7 Claims, 7 Drawing Sheets

AUTOMATIC GAIN CONTROL DEVICE FOR SPREAD SPECTRUM COMMUNICATION DEVICE

FIELD OF THE INVENTION

The present invention relates to a spread spectrum communication device, and in particular to an improvement of a system for controlling automatically a gain for correlation spikes in the communication device.

BACKGROUND OF THE INVENTION

Concerning the system for controlling automatically the gain for correlation spikes in the communication device, there is known e.g. that disclosed in U.S. Pat. No. 4,899,364. FIG. 7 indicates the fundamental construction of the prior art system described above.

In the figure, a correlation spike outputted by a demodulator 33 is compared with either one of two threshold voltages, positive or negative, given by a reference voltage generating section RV in a comparator section CA, depending on the polarity thereof. Responding to a result thus obtained, a counter control section CC selects a first or a second clock in a clock selecting section CL to give it to a counter section CU and makes it count in a positive or negative direction. A current responding to a count value thus obtained is generated by a gain control current generating section GC. The gain of a variable gain amplifier 32 disposed on the output side of a correlator 31 is controlled by this current so that the correlation spike is comprised between the positive and the negative threshold voltage.

However, by this system, a circuit for detecting a peak value is necessary for AGC and further a peak value detecting circuit is required for a peak value of each of a positive and a negative correlation spike signal. In addition, since the variable gain amplifier 32 is controlled, depending on the number of correlation spikes, it should be controlled logarithmically, depending on characteristics thereof, and for this reason, the gain control current generating section GC should have logarithmic characteristics.

Consequently the prior art system has a drawback that the circuit scale is great for this reason, which raises fabrication cost.

OBJECT OF THE INVENTION

In order to remove the drawback described above, the object of the present invention is to provide a spread spectrum communication device capable of simplifying the circuit for detecting a peak value of a correlation spike by using a signal of a correlation pulse generating circuit in the demodulating circuit to intend reduction in the circuit scale and cost down.

SUMMARY OF THE INVENTION

In order to achieve the above object, a spread spectrum communication device according to the present invention is characterized in that it comprises a variable gain amplifier circuit capable of varying a gain for correlation spikes obtained by a correlator; and A/D converting circuit for A/D-converting an output of the variable gain amplifier circuit; an absolute value detecting circuit for detecting an absolute value of an output of the A/D converting circuit; a peak value detecting circuit for detecting a value corresponding to a peak of an output of the absolute value detecting circuit; and control signal generating means for generating a gain control signal, which is given to the variable gain amplifier circuit, based on a peak value held by the peak value detecting circuit described above.

In this way, since the gain for the correlation spikes is controlled on the basis of the peak value of the correlation spikes obtained by a correlation pulse generating circuit, it is possible to control it at an optimum level.

DETAILED DESCRIPTION

Figure 1:
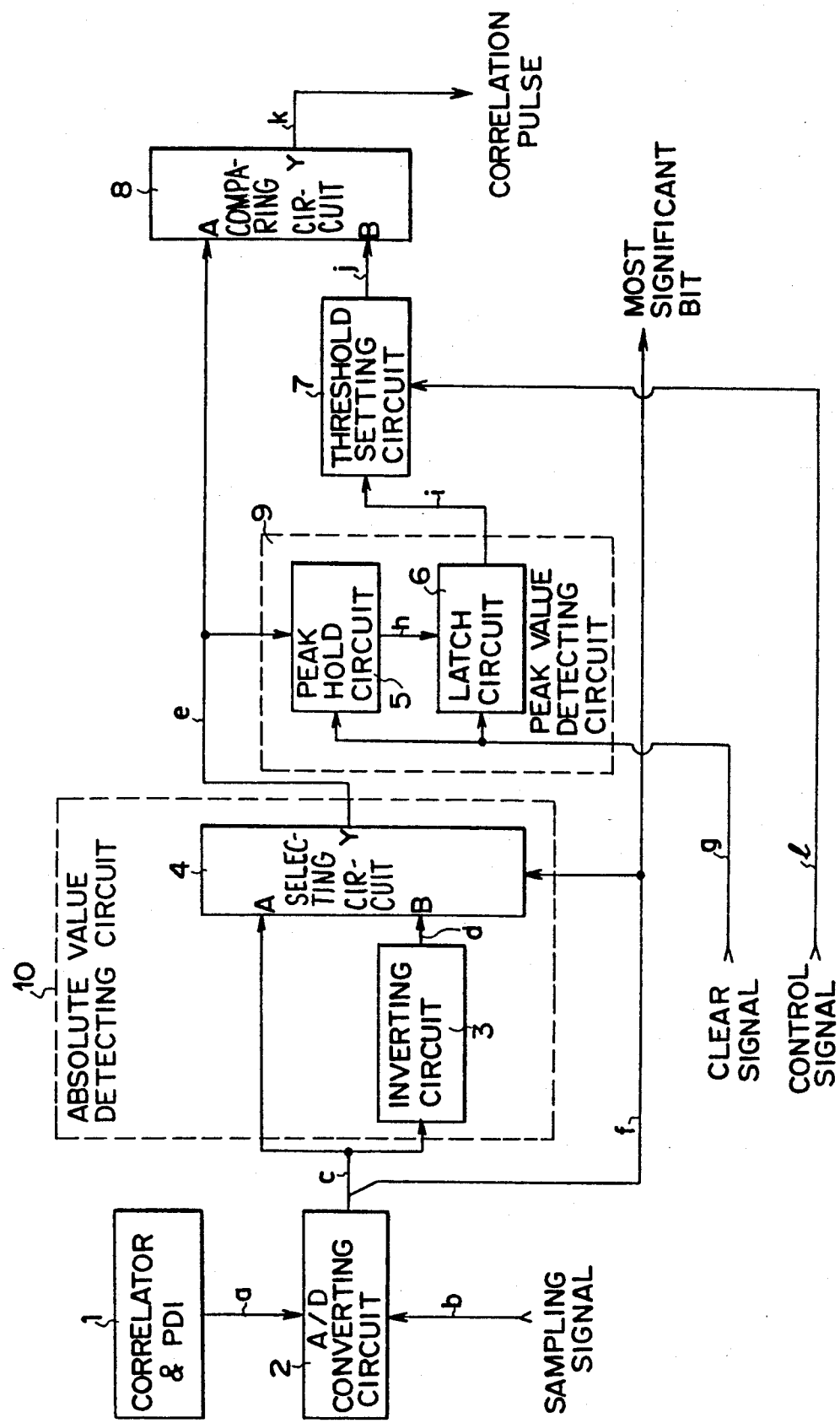
FIG. 1 is a block diagram showing a correlation pulse generating circuit used in the present invention.

FIG. 1 is a block diagram showing a correlation pulse generating circuit used in a spread spectrum communication device according to the present invention, in which reference numeral 1 ia a correlator and PDI (Post Detection Integration); 2 is an A/D converting circuit; 3 is an inverting circuit; 4 is a selecting circuit; 5 is a peak hold circuit; 6 is a latch circuit; 7 is threshold setting circuit; 8 is a comparing circuit; 9 is a peak value detecting circuit consisting of the peak hold circuit 5 and the latch circuit 6; and 10 is an absolute value detecting circuit consisting of the inverting circuit 3 and the selecting circuit 4.

Hereinbelow the operation of the circuit described above will be explained.

Figure 2:
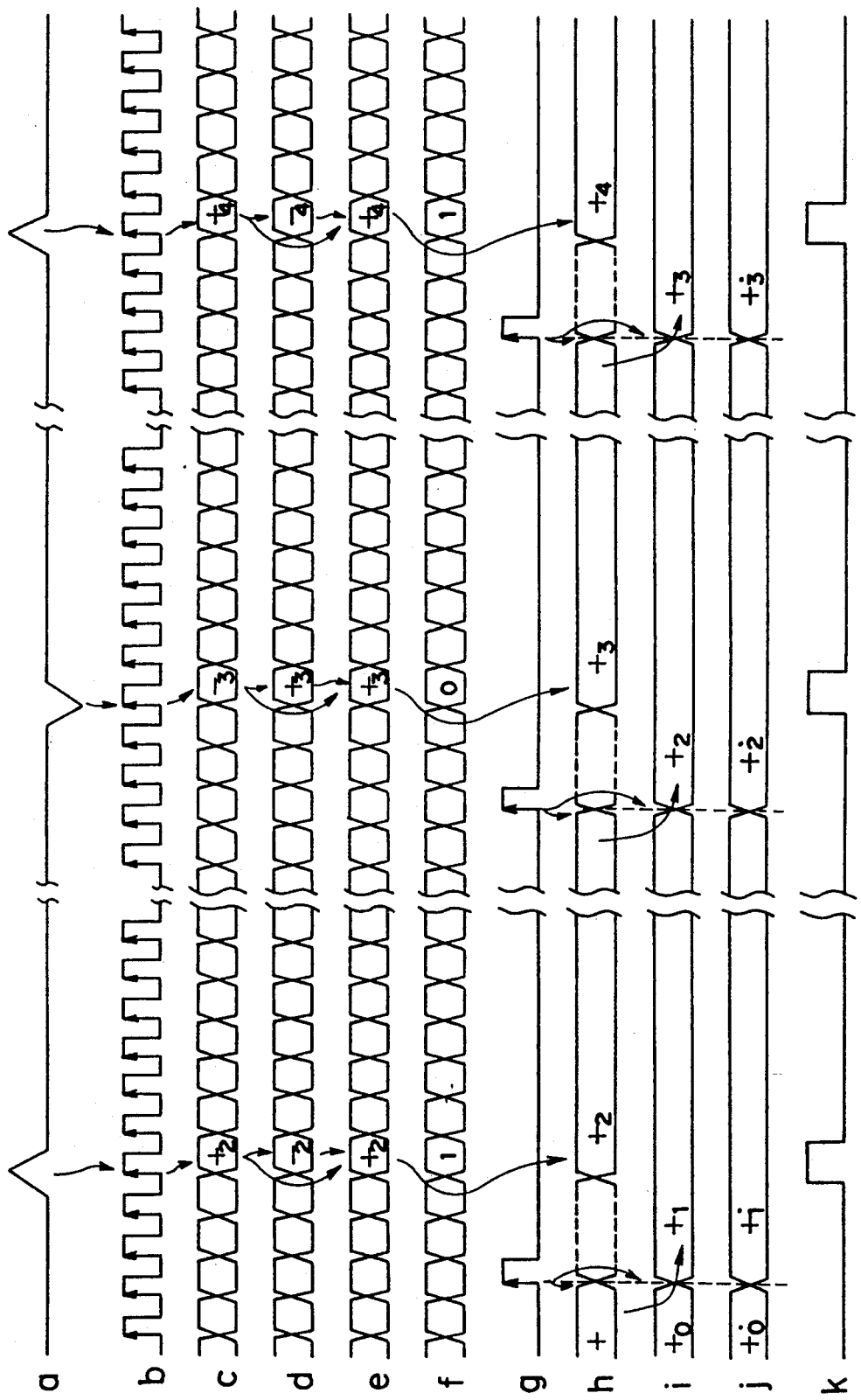
FIG. 2 is a timing chart for explaining the operation thereof.

FIG. 2 is a timing chart for signals in different parts of the circuit indicated in FIG. 1.

A correlation spike a from the correlator 1 is A/D-converted in the A/D converting circuit 2 on the basis of a sampling signal b to obtain an output c. Here the A/D conversion is effected at the rising edge of the sampling signal b for every period thereof.

Now supposing that the output code for the output c of the A/D converting circuit 2 is N bits and that it is in a linear relation with the input of the A/D converting circuit 2, the A/D conversion output c is in a region of $1_{MSB}, 0, \ldots, 0, 0_{LSB}' \sim 1_{MSB}, 1, \ldots, 1_{LSB}$ (MSB means the most significant bit, while LSB means the least significant bit), in the case where the correlation spike a from the correlator 1 has a positive polarity; in a region of $0_{MSB}, 1, \ldots, 1, 1_{LSB} \sim 1_{MSB}, 0, \ldots, 0, 0_{LSB}$, in the case where the correlation spike a from the correlator 1 has a negative polarity; and in the neighborhood of $1_{MSB}, 0, \ldots, 0, 0_{LSB}$ at noise.

That is, in the case of the positive polarity, the most significant bit is always "1" and the remaining bits indicates a region from all "0" to all "1" which is the greatest. On the contrary, in the case of the negative polarity, the most significant bit is always "0" and the remaining bits indicates a region from all "1" to all "0" which is the smallest.

Consequently, by inverting the polarity of the output c of the A/D converting circuit 2, the negative polarity becomes equivalent to the positive polarity (the converse thereof is also valid). The output c of the A/D converting circuit 2 is inputted directly in the selecting circuit 4 and at the same time and the output d of the inverting circuit 3 obtained by inverting the output c of the A/D converting circuit 2 in the polarity by means of the inverting circuit 3 is inputted therein. Further, in FIG. 2, the values of the output c after the A/D conversion of the positive and the negative polarity correlation spike a are made correspond to + and −, respectively. Consequently, the respective outputs d of the inverting circuit 3 correspond to +→− and −→+.

Utilizing a property that a positive polarity and a negative polarity correlation spike corresponding to an information signal are never generated simultaneously, in the selecting circuit 4 an operation is effected that using the most significant bit f of the output c of the A/D converting circuit 2 as a trigger, in the case where the most significant bit f is "1" (that is, for a positive polarity correlation spike), the output c of the A/D converting circuit 2 is made pass through, and in the case where the most significant bit f is "0" (that is, for a negative polarity correlation spike), the output d of the inverting circuit 3 is made pass through.

In a period of time, where neither positive polarity nor negative polarity correlation spike exists, the selecting circuit 4 makes either one of them pass through, depending on noise distribution (state of the most significant bit f). Periods of time, where no signals (+, −, 1, 0) exist, in c to f in FIG. 2, represent such cases.

As described above, the selecting circuit 4 selects either one of two inputs, depending on the most significant bit f of the output c of the A/D converting circuit 2, which represents an operation of detecting the absolute value of the correlation spike.

Next the maximum value of the output e of the selecting circuit 4 is detected and held by the peak hold circuit 5. In this way the maximum value of the absolute value is obtained from both of the positive polarity and the negative polarity correlation spike, independently of which the polarity is, positive or negative.

Further, using a clear signal g as a trigger, the maximum value obtained by the peak hold circuit 5 is latched by the latch circuit 6 and at the same time a content h stored in the peak hold circuit 5 is cleared. Here the pulse period of the clear signal g is identical to one period of the correlation spike. That is, the peak hold circuit 5 clears the content h stored therein for every period of the correlation spike by using the clear signal g and effects peak hold for a new period of the correlation spike.

Therefore, using a peak hold circuit having this circuit construction, the maximum value for every period of the correlation spike can be surely detected. In addition, the maximum value stored in the latch circuit is similarly updated for every period of the correlation spike.

By adopting such a construction, if variations in the level take place in the output of the correlator within one period thereof, they can be followed and it is possible to eliminate erroneous operations in the case where the polarity of the correlation spike is varied.

Next an output i of the latch circuit 6 is inputted in the threshold setting circuit 7. The threshold setting circuit 7 executes an operation of data of the output i and a control signal 1 representing a multiplication coefficient to produce a threshold signal j. This threshold signal j is a digital signal of N bits. Further the threshold setting circuit 7 can set an arbitrary threshold signal on the basis of the control signal 1 and the control signal 1 is produced e.g. by a CPU, etc.

Subsequently the threshold signal j obtained by the threshold setting circuit 7 is inputted in the comparing circuit 8.

The comparing circuit 8 compares the output e selected by the selecting circuit 4 from the output c of the A/D converting circuit 2 and the output d of the inverting circuit, which is obtained by inverting the output c of the A/D converting circuit 2 in the polarity, with the threshold signal j of the threshold setting circuit 7 to obtain a correlation spike k, when an output e greater than the threshold signal j is inputted.

Further complementing the above description, when the correlation spike a indicated in the first line in FIG. 2 has the positive polarity, by detecting the maximum value ($+_2$) in one period, where the positive polarity correlation spike exists, by the peak value detecting circuit 9, the threshold signal j ($+_2'$) in the succeeding one period can be set and further it is possible to obtain a final correlation pulse k for the absolute maximum value ($+_3$) in that period by the comparing circuit 8.

Furthermore, since the final correlation pulse k is obtained, corresponding to the correlation spike a from the correlator 1, it is easily done by knowing the most significant bit f in the timing, where this correlation pulse k is obtained, to judge which the polarity of the correlation spike a is for this final correlation spike k (positive polarity correlation spike, when it is "1", and negative polarity correlation spike, when it is "0").

Figure 3:
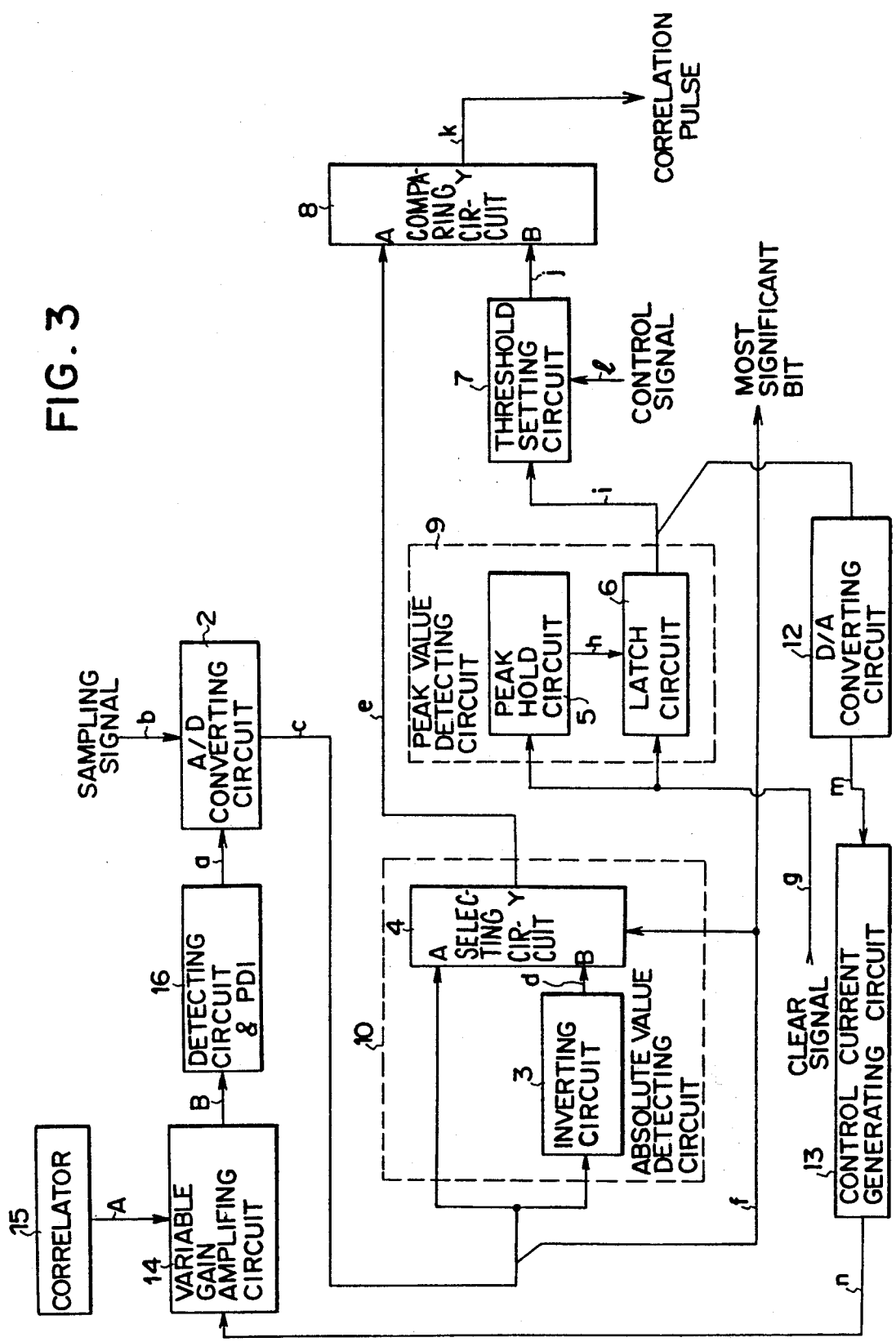
FIG. 3 is a block diagram showing an embodiment of the present invention.

According to the present invention, automatic gain control for the correlation spike is effected by using peak value data i detected by the peak value detecting circuit in the correlation pulse generating circuit and an embodiment thereof is indicated in FIG. 3.

In the figure, same reference numerals as those used in FIG. 1 represent parts identical or similar thereto and 12 is a D/A converting circuit; 13 is a control current generating circuit; 14 is a variable gain amplifying circuit; 15 is a correlator; and 16 is a detecting circuit and PDI circuit.

Figure 4:
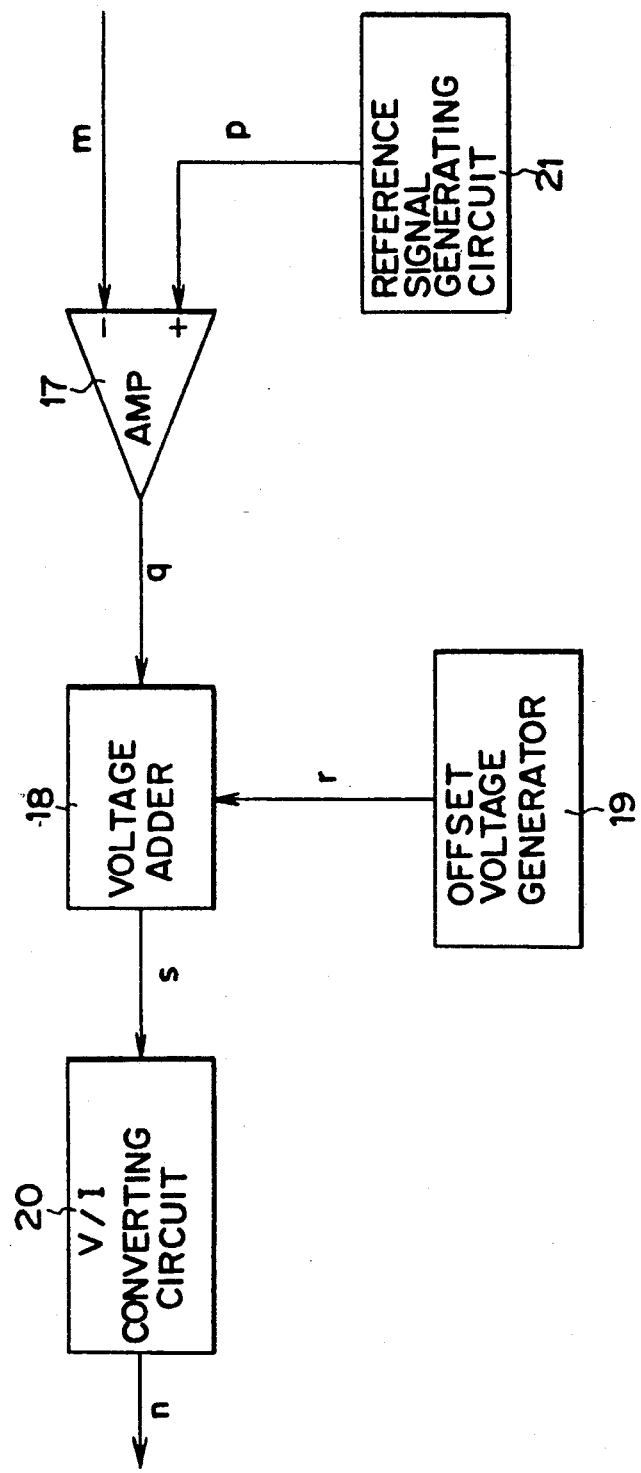
FIG. 4 is a block diagram showing an example of the construction of a control current generating circuit.

The correlator 15 can be e.g. a convolver. An output signal A of the correlator 15 is a high frequency signal, as indicated in FIG. 6(a). This signal is amplified by the variable gain amplifying circuit 14. A signal B outputted by the variable gain amplifying circuit 14 is detected and integrated by the detecting circuit and PDI 16 and a signal a, as indicated in FIG. 6(c), is obtained. This signal a is converted into a digital signal c by the A/D converting circuit 2. An absolute value e of this signal c is obtained by giving it to the absolute value detecting circuit 10. Then the maximum value of this signal e is obtained in this way. This value is latched by the latch circuit 6. Latched data, i.e. peak value data i, are converted into an analogue signal m by the D/A converting circuit 12. Responding to this signal m, a control current n controlling the variable gain amplifying circuit 14 is produced by the control current generating circuit 13. Here the control current generating circuit 13 is constructed e.g. as indicated in FIG. 4. In the figure, 17 is a differential amplifier; 18 is a voltage adder; 19 is an off-set voltage generator; 20 is a V/I converting circuit; and 21 is a reference signal generating circuit.

Figure 6:
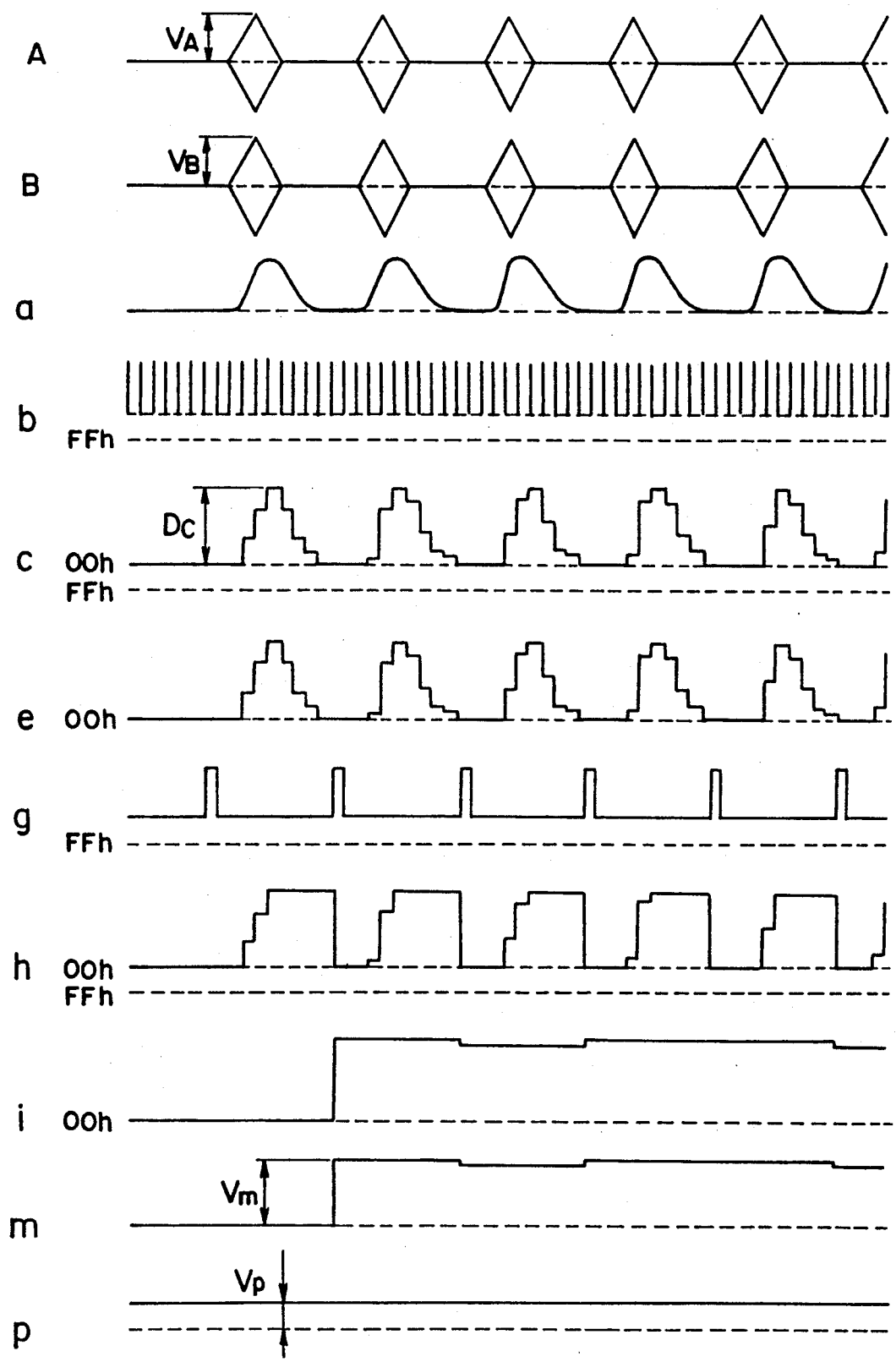
FIG. 6 is a timing chart for explaining the operation of the embodiment indicated in FIGS. 3 and 4.
Figure 7:
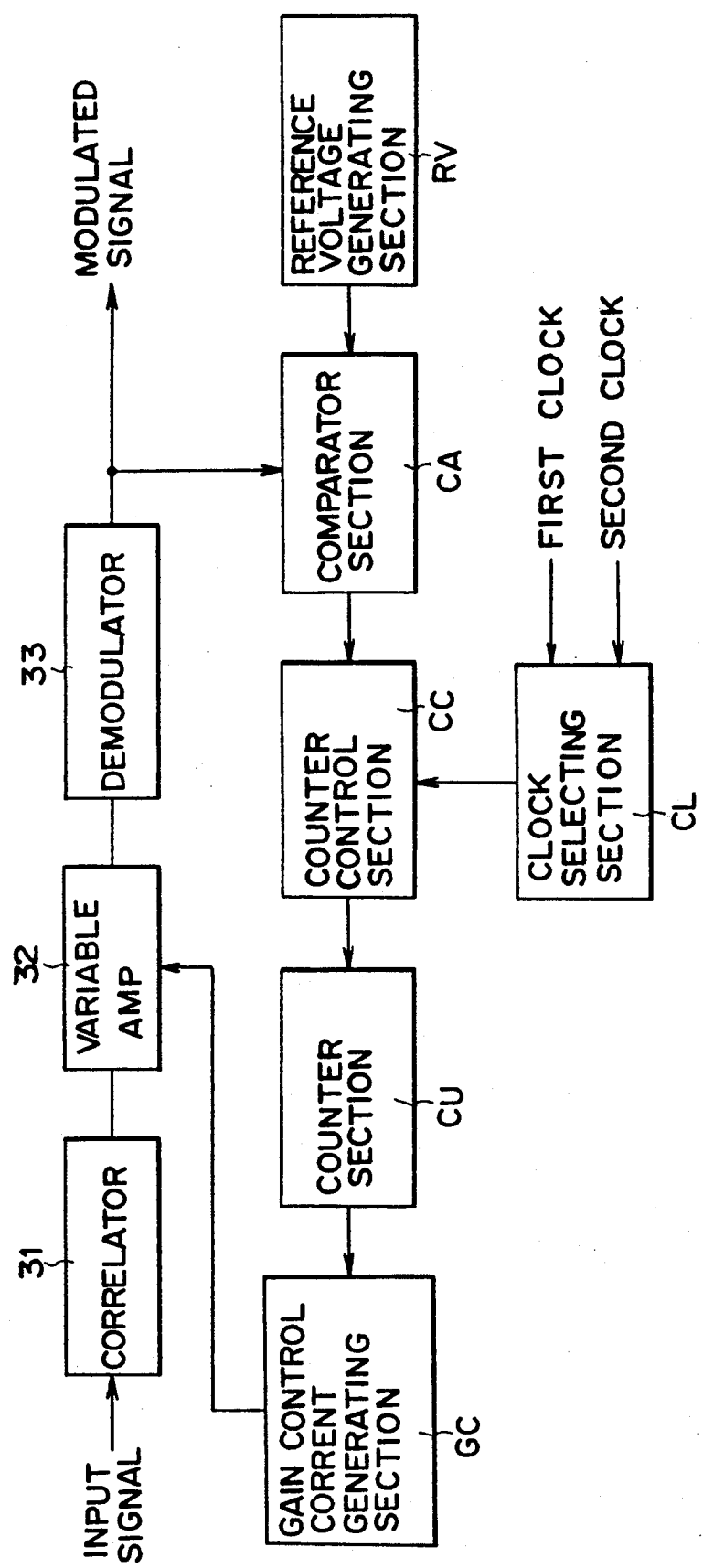
FIG. 7 is a block diagram showing the fundamental construction of a prior art automatic gain control system.

Next the operation of the circuit indicated in FIG. 4 will be explained, referring to waveforms in different parts in FIG. 6. In the case where the output signal A from the correlator 15 is outputted, this signal A is amplified by the variable gain amplifying circuit 14. Supposing that the gain at this time is $A_o$, when the control current n is In, and $A_o \alpha$ In, the output signal B is given by;

$$V_B = A_o \cdot V_A \qquad (1)$$

(where $V_B$ represents the target control level.)

This is inputted in the detecting circuit and PDI 16 to obtain the signal a. This is converted into the digital signal c in the A/D converting circuit 2 by the sampling signal b. Here it is supposed that $$V_B = D_c \qquad (2)$$

(where $D_c$ is supposed to be ½ of the full scale of the A/D converting circuit 13.)

The signal c is given to the absolute value detecting circuit 10 to obtain the absolute value e thereof. Data of the peak of this absolute value e are held by the peak hold circuit 5 and that peak value h is latched by the latch circuit 6. These data are cleared for every period by the clear signal g. Consequently the latched data (peak value data) i detected by the peak value detecting circuit 19 represent the peak value in a time region of one period of the clear signal g.

These latched data i are converted by the D/A converting circuit 12 to obtain the analogue signal m. This signal is inputted in the control current generating circuit 13 and the control circuit n is outputted. In the control current generating circuit as indicated in FIG. 4, a reference signal p is outputted by the reference signal generating circuit 21 and inputted in the non-inverting input terminal + of the differential amplifier 17. On the other hand, the analogue signal m is inputted in the inverting input terminal. Therefore through the output of the differential amplifier 17 a signal q;

$$V_q = A_v \cdot (V_q - V_m) \qquad (3)$$

(where Av represents the voltage amplification factor of the operational amplifier 17)

is outputted. This signal q is inputted in the voltage adder 18 and added to an off-set voltage r outputted by the off-set voltage generating circuit 19. A signal s obtained by this addition is converted into the control current n by the V/I converting circuit 20. The control current n at this time is In.

$$V_s = V_q + V_r \qquad (4)$$

$$In \alpha V_s \qquad (5)$$

Now, supposing that the signal A is $V_{A1}$ ($V_A < V_{A1}$), the output signal B of the variable gain amplifying circuit 14 is given by;

$$V_{B1} = A_0 \cdot V_{A1} \qquad (6)$$

(where $V_B < V_{B1}$).

Consequently the output signal c of the A/D converting circuit 2 is $D_{c1}$ ($D_c < D_{c1}$). Then similarly the peak value i is latched and the analogue signal m is outputted by the D/A converting circuit 12. The level at this time is $V_{m1}$ ($V_m < V_{m1}$). Consequently the output level of the differential amplifier 17 is given by;

$$V_{q1} = A_v \cdot (V_q - V_{m1}) \qquad (7)$$

(where $V_q > V_{q1}$).

Consequently the control current n is given by;

$$V_{s1} = V_{q1} + V_r \qquad (8)$$

(where $V_{s1} < V_s$).
Therefore $$In_1 \alpha V_{s1} \qquad (9)$$

(where $In_1 < In$).

is valid. As the result, the gain of the variable gain amplifying circuit 14 is $A_1$ ($A_1 < A_0$) and the level of the output signal B is given by;

$$V_{B2} = A_1 \cdot V_{A1} \qquad (10)$$

($V_B < V_{B2} < V_{B1}$).

Then the control is effected, until $V_B = V_{B2}$. On the other hand, also in the case where $V_{A1} < V_A$ is valid, similar control is effected.

Figure 5:
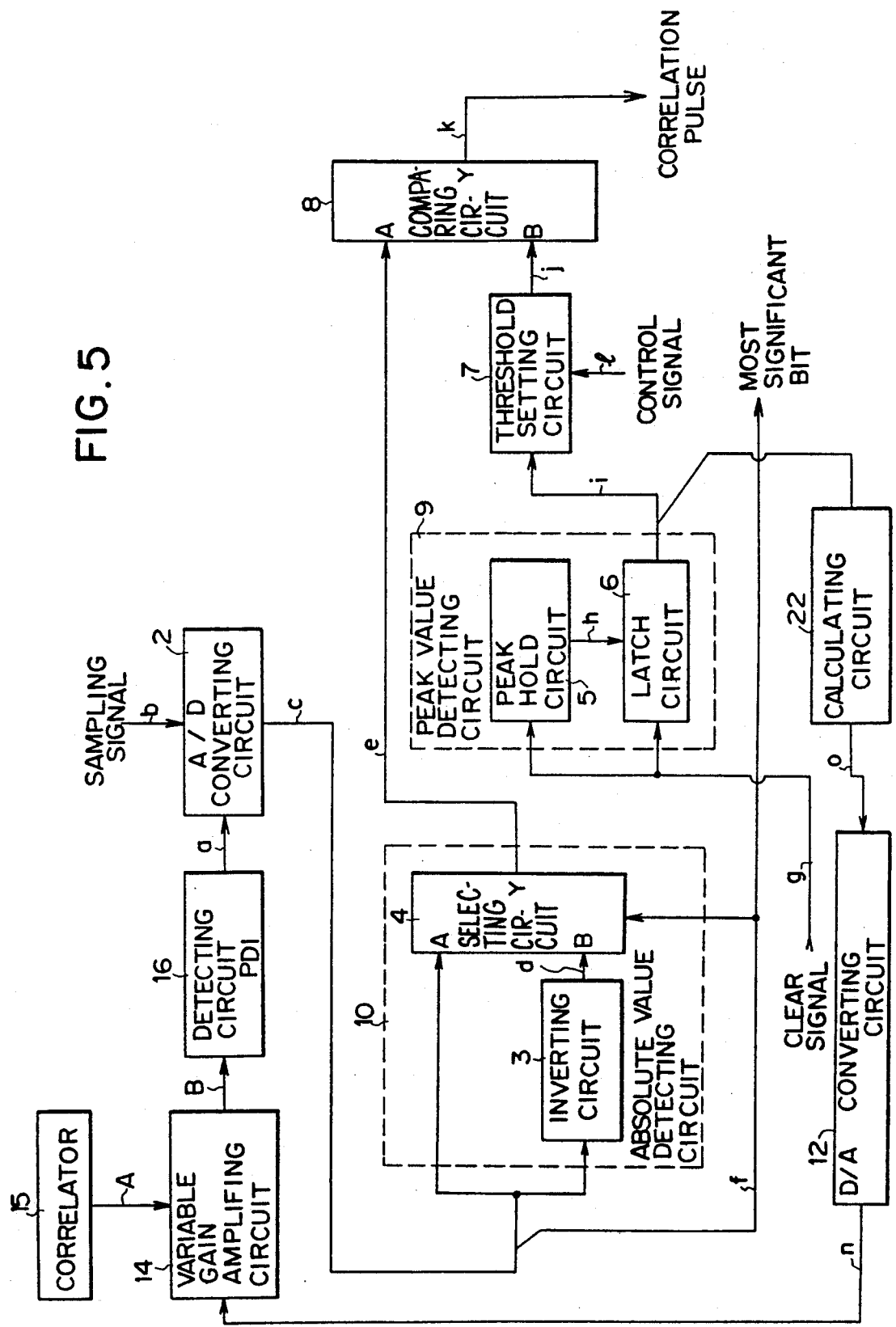
FIG. 5 is a block diagram showing another embodiment of the present invention.

FIG. 5 indicates another embodiment of the present invention, which effects a digital processing type automatic gain control, in which 22 represents a calculating circuit. The calculating circuit 22 executes operations similar to those executed by the control current generating circuit 13 to generate control data 0. Then they are converted into an analogue control current n by the D/A converting circuit 12. As the result, it is possible to effect control similar to the analogue type embodiment indicated in FIG. 3.

As explained above, according to the present invention following effects can be obtained;

(1) since peak value data of a correlation spike detected by a demodulating system are used, it is possible to control the output at the optimum level;

(2) since peak value data detected by a correlation pulse generating circuit are used, the AGC circuit is simplified;

(3) a construction can be realized, by which the AGC control can be effected either by an analogue signal or by a digital signal; and (4) it is unnecessary that the control current generating circuit has logarithmic characteristics.

While particular embodiments of the invention have been shown and described, it will be obvious to those skilled in the art that various changes and modifications may be made without departing from the present invention in its broader aspect.

The embodiments of the invention in which an exclusive property or privilege is claimed are defined as follows:

1. An automatic gain control device for correlation signals comprising:
 a correlator;
 a variable gain circuit varying a gain for correlation spikes outputted by said correlator, based on a control signal;
 an A/D converting circuit for A/D-converting an output of said variable gain circuit;
 an absolute value detecting circuit for detecting an absolute value of an output of said A/D converting circuit;
 a peak value detecting circuit for detecting a value corresponding to a peak of an output of said absolute value detecting circuit; and control signal generating means for generating said control signal, based on the peak value held by said peak value detecting circuit.

2. A device according to claim 1, wherein said control signal generating means includes a D/A converter for D/A-converting said peak value; and a control signal generator for generating said control signal, responding to an output of said D/A converter.

3. A device according to claim 2, wherein said control signal generator includes a differential amplifier for generating a difference signal corresponding to a difference between an output of said D/A converter and a reference signal; an adder for adding an off-set signal to said difference signal; and a V/I converter for V/I-converting an output of said adder to obtain said control signal.

4. A device according to claim 1, wherein said control signal generator includes a calculating circuit, in which said peak value is inputted; and a D/A converter for D/A-converting an output of said calculating circuit to obtain said control signal.

5. A device according to claim 1, wherein said absolute value detecting circuit includes a selecting circuit having two inputs and an inverting circuit, wherein an output of said A/D converting circuit is inputted directly in one input of said selecting circuit and in another input thereof through said inverting circuit.

6. A device according to claim 1, wherein said peak value detecting circuit includes a peak hold circuit for holding an output of said absolute value detecting circuit and a latch circuit for latching an output of said peak hold circuit.

7. An automatic gain control device for correlation signals comprising:

a correlator;

a variable gain circuit varying a gain for correlation spikes outputted by said correlator, based on a control signal;

an A/D converting circuit for A/D-converting an output of said variable gain circuit;

an absolute value detecting circuit for detecting an absolute value of an output of said A/D converting circuit;

a peak value detecting circuit for detecting a value corresponding to a peak of an output of said absolute value detecting circuit for every predetermined period thereof;

comparing means for comparing the peak value held by said peak value detecting circuit with the output of said absolute value detecting circuit to obtain a correlation pulse; and control signal generating means for generating said control signal, based on the peak value held by said peak value detecting circuit.

* * * * *